(12) United States Patent
Park et al.

(10) Patent No.: US 7,777,835 B2
(45) Date of Patent: Aug. 17, 2010

(54) LIQUID CRYSTAL DISPLAY

(75) Inventors: Won-Sang Park, Yongin-si (KR);
Hyung-Guel Kim, Yongin-si (KR);
Young-Bee Chu, Suwon-si (KR);
Kee-Han Uh, Yongin-si (KR);
Dong-Hwan Kim, Suwon-si (KR);
Kyu-Seok Kim, Yongin-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 562 days.

(21) Appl. No.: 11/499,445

(22) Filed: Aug. 4, 2006

(65) Prior Publication Data

US 2007/0030867 A1 Feb. 8, 2007

(30) Foreign Application Priority Data

Aug. 5, 2005 (KR) ...................... 10-2005-0071629

(51) Int. Cl.
*G02F 1/1335* (2006.01)
(52) U.S. Cl. ........................................ 349/69; 349/106
(58) Field of Classification Search .................. 349/69, 349/106
See application file for complete search history.

(56) References Cited

U.S. PATENT DOCUMENTS 5,243,455 A * 9/1993 Johnson et al. ............... 349/18
2002/0196393 A1* 12/2002 Tashiro et al. ............... 349/106
2003/0184694 A1* 10/2003 Chang et al. ................ 349/113
2004/0095531 A1* 5/2004 Jiang et al. .................. 349/115
2005/0185112 A1* 8/2005 Hara ............................ 349/61
2005/0212992 A1* 9/2005 Nakanishi .................... 349/61
2007/0182887 A1* 8/2007 Haga et al. .................. 349/106

FOREIGN PATENT DOCUMENTS

CN 2553398 Y 5/2003

* cited by examiner

*Primary Examiner*—K. Cyrus Kianni
(74) *Attorney, Agent, or Firm*—Innovation Counsel LLP

(57) ABSTRACT

A liquid crystal display according to an embodiment of the present invention includes: a liquid crystal panel assembly comprising a plurality of first field-generating electrodes, a second field-generating electrode facing the first field-generating electrodes, a liquid crystal layer disposed between the first field-generating electrodes and the second field-generating electrode, and red, green, and blue color filters disposed at positions corresponding to the first field-generating electrodes; and a light source providing light to the liquid crystal panel assembly, wherein the light source emits a light comprising a red component having a central wavelength of about 620-680 nm and a half amplitude of about 25-70 nm, a green component having a central wavelength of about 525-545 nm and a half amplitude of about 20-50 nm, and a blue component having a central wavelength of about 430-480 nm and a half amplitude of about 25-70 nm.

9 Claims, 14 Drawing Sheets

RED

GREEN

LIQUID CRYSTAL DISPLAY

CROSS-REFERENCE TO RELATED APPLICATION

This application claims priority to and the benefit of Korean patent application no. 10-2005-0071629 filed in the Korean Intellectual Property Office on Aug. 5, 2005, the entire contents of which are incorporated herein by reference.

FIELD OF THE INVENTION

The present invention relates to a liquid crystal display.

DESCRIPTION OF RELATED ART

Among the types of display devices used for computer monitors and television sets are self-emitting displays such as organic light emitting displays (OLEDs), vacuum fluorescent displays (VFDs), field emission displays (FEDs), and plasma panel displays (PDPs). Non-emitting display devices such as liquid crystal displays (LCDs) require an external light source. LCDs include two panels provided with field-generating electrodes and a liquid crystal (LC) layer exhibiting dielectric anisotropy that, in the presence of an applied electric field, display images by varying the light transmittance of the liquid crystal layer. The light for an LCD may be provided by back-light assembly of lamps or by incident natural light. A lighting assembly for an LCD may include light sources such as cold cathode fluorescent lamps (CCFL), external electrode fluorescent lamps (EEFL), or light emitting diodes (LED).

Because the lighting unit for an LCD consumes considerable power, it is of interest to increase the efficiency of the light unit or to decrease the time during which the light unit draws power. In particular, the power consumption of the lighting unit is of great concern in portable devices such as mobile phones. When color filters are used to improve color reproducibility of the LCD, color filters having high saturation are often utilized. However, high-saturation color filters reduce light transmission.

SUMMARY OF THE INVENTION

A liquid crystal display according to an embodiment of the present invention includes: a liquid crystal panel assembly comprising a plurality of first field-generating electrodes, a second field-generating electrode facing the first field-generating electrodes, a liquid crystal layer disposed between the first field-generating electrodes and the second field-generating electrode, and red, green, and blue color filters disposed at positions corresponding to the first field-generating electrodes; and a light source, wherein the light source emits a light comprising a red component having a central wavelength of about 620-680 nm and a half amplitude at about 25-70 nm, a green component having a central wavelength of about 525-545 nm and a half amplitude at about 20-50 nm, and a blue component having a central wavelength of about 430-480 nm and a half amplitude at about 25-70 nm.

The green color filter transmits about 77-85% of the light having a wavelength of about 540 nm and transmits about 15-20% of the light having a wavelength equal to or shorter than about 460 nm. The red color filter transmits at least about 90% of light having a wavelength equal to or longer than about 630 nm, and transmits less than about 10% of light having a wavelength of from about 430 nm to about 560 nm, and transmits at least about 10% of light having a wavelength of about 560 nm to about 630 nm. The blue color filter transmits at least about 10% of light having a wavelength from about 380 nm to about 500 nm and transmits at least about 70% of light having a wavelength of about 440 nm.

The light source includes a white light emitting diode that is a blue light emitting diode coated with green and red color fluorescent material or includes a red light emitting diode, a green light emitting diode, and a blue light emitting diode that are arranged in mixture.

The luminance of the green component and the luminance of the red component may advantageously be higher than the luminance of the blue component.

The liquid crystal display may further include a selective reflecting film disposed between the liquid crystal panel assembly and the light source.

A liquid crystal display according to another embodiment of the present invention includes: a liquid crystal panel assembly comprising two substrates facing each other, a liquid crystal layer disposed between the two substrates, electrodes driving the liquid crystal layer, and a plurality of red, green, and blue color filters disposed on one of the two substrates; and a light source providing the liquid crystal panel assembly, wherein an emission spectrum of the light source has separated peaks corresponding to red, green, and blue regions, and the green color filter transmits about 77-85% of light having a wavelength of about 540 nm and transmits about 15-20% of light having a wavelength equal to or shorter than about 460 nm.

The light source advantageously emits a light comprising a red component having a central wavelength of about 620-680 nm and a half amplitude of about 25-70 nm, a green component having a central wavelength of about 525-545 nm and a half amplitude of about 20-50 nm, and a blue component having a central wavelength of about 430-480 nm and a half amplitude of about 25-70 nm.

BRIEF DESCRIPTION OF THE DRAWINGS

The present invention will become more apparent from a reading of the ensuing description together with the drawing, in which.

DETAILED DESCRIPTION OF EMBODIMENTS

Figure 1:
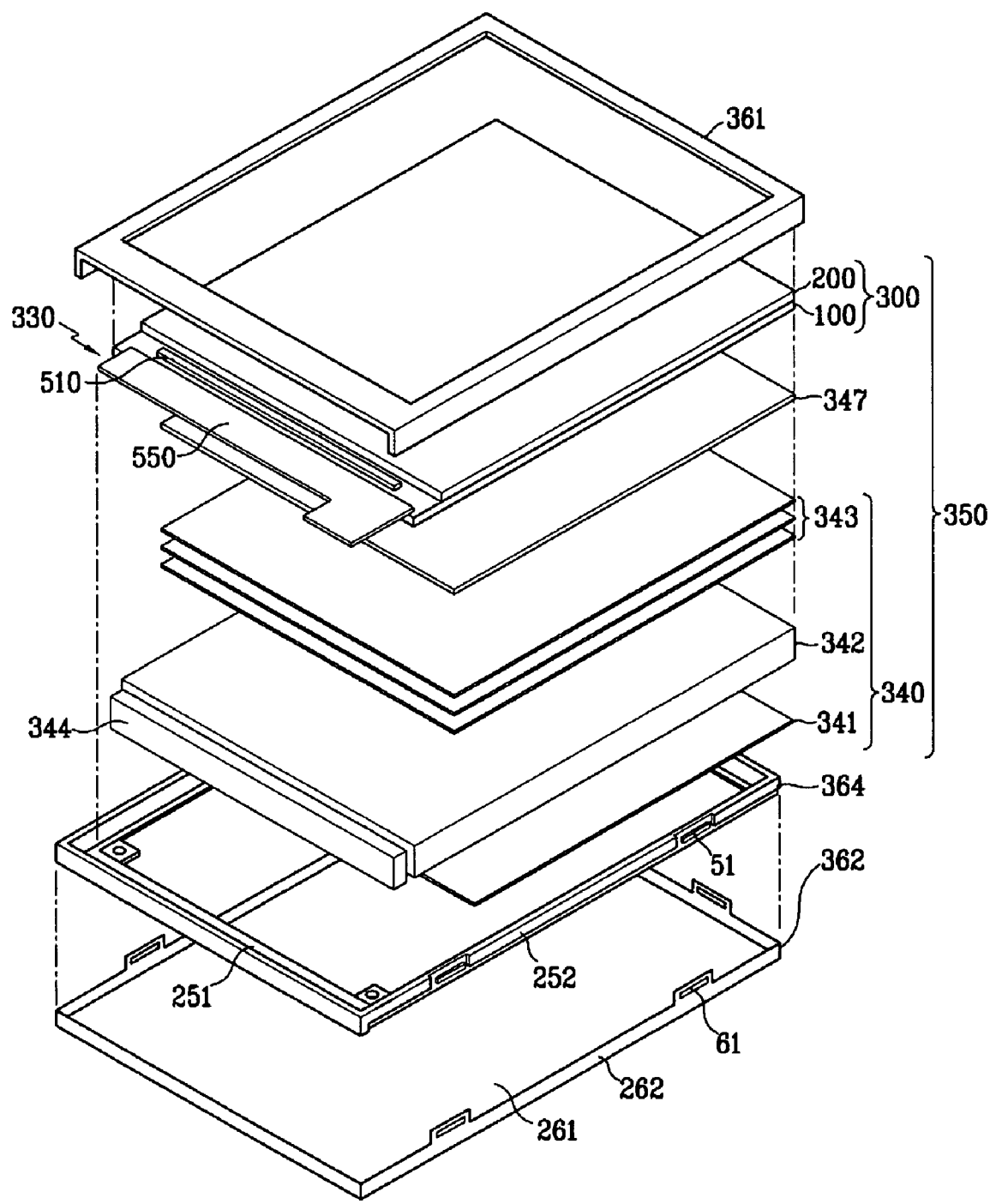
FIG. 1 is an exploded perspective view of an LCD according to an embodiment of the present invention.

The present invention now will be described more fully hereinafter with reference to the accompanying drawings, in which preferred embodiments of the inventions invention are shown. In the drawings, the thickness of layers and regions are exaggerated for clarity. Like numerals refer to like elements throughout. It will be understood that when an element such as a layer, film, region, substrate or panel is referred to as being "on" another element, it can be directly on the other element or intervening elements may also be present. In contrast, when an element is referred to as being "directly on" another element, there are no intervening elements present.

Figure 5A:
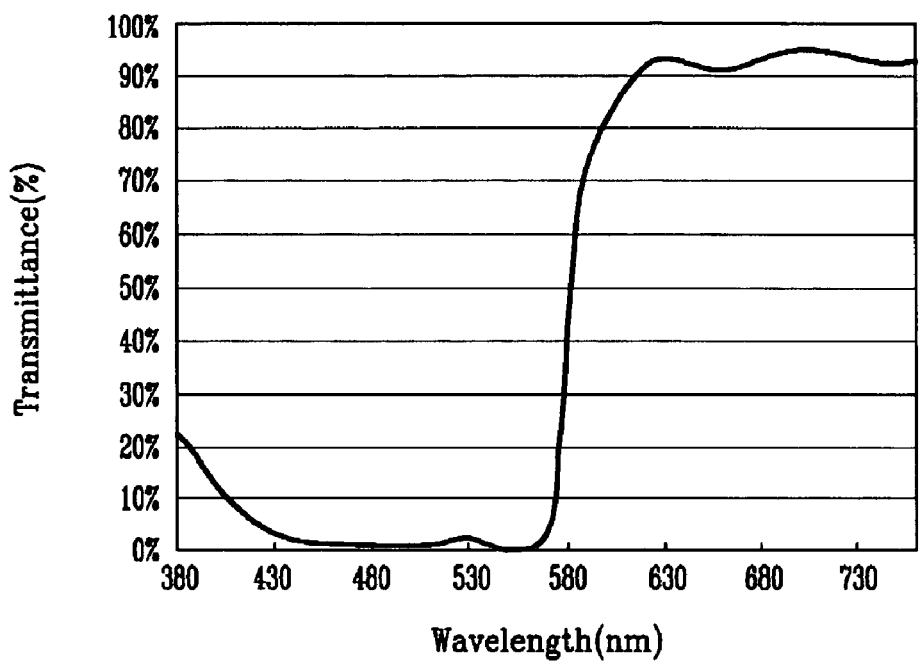
FIGS. 5A, 5B and 5C are graphs illustrating transmission spectra of red, green, and blue color filters according to an embodiment of the present invention
Figure 5B:
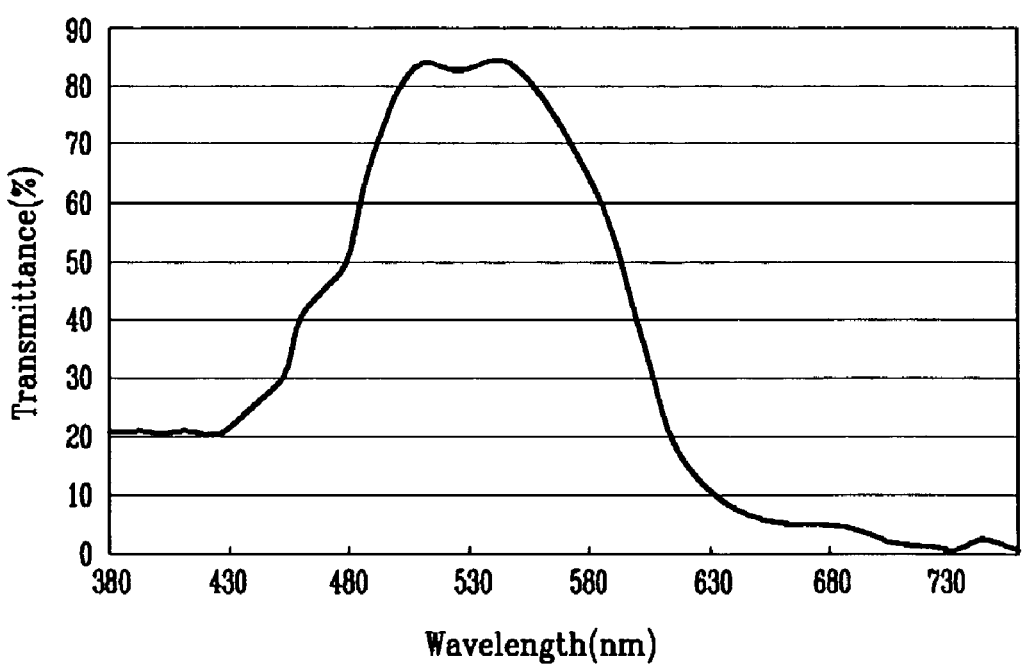
Figure 5C:
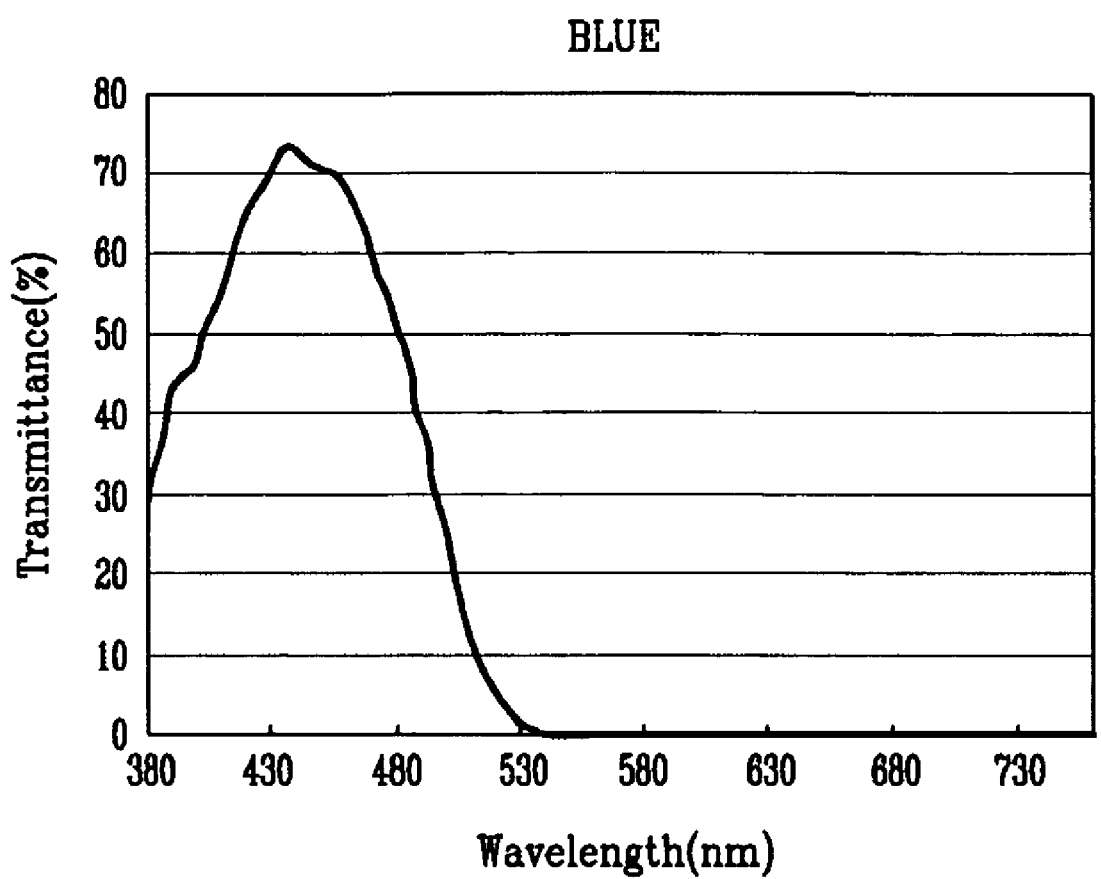

A liquid crystal display according to an embodiment of the present invention is described in detail with reference to FIGS. 1, 5A, 5B and 5C. FIG. 1 is an exploded perspective view of an LCD according to an embodiment of the present invention, and FIGS. 5A, 5B and 5C are graphs illustrating transmission spectra of red, green, and blue color filters according to an embodiment of the present invention.

Referring to FIG. 1, the LCD according to an embodiment of the present invention includes a liquid crystal (LC) module 350, which includes a display unit 330, a backlight unit 340, and a selective reflection film 347, and a mold frame 364 and upper and lower chassis 363 containing and fixing the LC module 350.

The display unit 330 includes a LC panel assembly 300, a driving integrated circuit chip (referred to as "driving chip" hereinafter), and a circuit board 550.

The LC panel assembly 300 includes a lower panel 100, an upper panel 200 facing the lower panel 100, and a liquid crystal layer (not shown) interposed between the lower panel 100 and the upper panel 200. One of the lower and the upper panels 100 and 200 includes a plurality of pixel electrodes (not shown) arranged in a matrix, a plurality of thin film transistors (TFTs) (not shown) coupled to the pixel electrodes, and a plurality of signal lines including gate lines (not shown) and data lines (not shown) coupled to the TFTs.

The other of the lower and the upper panels 100 and 200 includes a plurality of red, green, and blue color filters (not shown) and a common electrode (not shown).

The red color filters, as shown in FIG. 5A, transmit less than about 10% of light having a wavelength of from about 430 nm to about 560 nm. The transmittance of the red color filters rapidly increases for a wavelength of about 560 nm to about 630 nm and reaches about 90% or more for red light having a wavelength equal to or longer than about 630 nm. The red color filters also transmit about 10% or more of visible light having a wavelength equal to or shorter than about 420 nm.

The green color filters, as shown in FIG. 5B, transmit about 10% or more of light having a wavelength from about 480 nm to about 620 nm, and in particular, the transmittance thereof reaches about 77-85% (averaging about 80%) of light having a wavelength of about 540 nm. The green color filters transmit about 15-20% (averaging about 20%) of visible light having a wavelength equal to or shorter than about 460 nm, and transmit about 5% or less of light having a wavelength equal to or longer than about 700 nm.

The blue color filters, as shown in FIG. 5C, transmit about 10% or more of light having a wavelength from about 380 nm to about 500 nm, and in particular, the transmittance thereof reaches about 70% or more of light having a wavelength of about 440 nm to be a peak. The blue filters transmit about 5% or less of light having a wavelength equal to or longer than about 530 nm.

According to another embodiment of the present invention, the color filters or the common electrode and the pixel electrodes may be provided at the same panel 100 or 200. When the common electrode and the pixel electrodes are disposed on the same panel 100 or 200, at least one of the common electrode and the pixel electrodes has a shape of a bar or a stripe.

The LC layer includes LC molecules that have orientations depending on the electric fields generated between the pixel electrodes and the common electrode, and the orientations of the LC molecules determine the polarization of the incident light.

The driving chip 510 that applies electrical signals to the gate lines and the data lines of the lower panel 100 is mounted on the lower panel 100 near an edge of the lower panel 100. Instead of one driving chip 510, two or more driving chips respectively providing signals to the gate lines and the data lines may be mounted on the lower panel 100.

The circuit board 550 that may be flexible is attached on the lower panel 100 near the driving chip 510. The circuit board 550 carries several circuit elements such as a signal controller for generating control signals controlling the driving chip 510.

The backlight unit 340 is disposed under the display unit 330 and that supplies light to the display unit 330. The backlight unit 340 includes a light source 344, a light guide 342, a plurality of optical sheets 343, and a reflecting sheet 341.

The light source 344 is disposed near a lateral surface of the light guide 342, and generates light to be supplied to the light guide 342. The light emitted from the light source 344, as shown in FIG. 8B, includes red light having a central wavelength of about 620-680 nm and a half amplitude of about 25-70 nm, green light having a central wavelength of about 525-545 nm and a half amplitude of about 20-50 nm, and blue light having a central wavelength of about 430-480 nm and a half amplitude of about 25-70 nm. The light source 344 may include a white light emitting diode (LED) that is a blue LED coated with green and red color fluorescent material, or may include a red LED, a green LED, and a blue LED that are properly arranged in mixture. The output of the LED or the amount of the fluorescent material in the LED is adjusted so that the luminance of green light is higher than that of blue light and the luminance of the red light is also higher than that of blue light, thereby maintaining high luminance and white balance.

Examples of the light source 344 other than an LED include a cold cathode fluorescent lamp (CCFL) and an external electrode fluorescent lamp (EEFL). A (flexible) circuit board (not shown) for controlling the light source 344 may be attached near the light source 344.

The light source 344 may be disposed both opposing side surfaces of the light guide 342 or may include several lamps disposed under the light guide 342. In the latter case, the light guide 342 may be omitted.

The light guide 342 guides light to the panel assembly 300, and may include a light guiding pattern therefor.

The optical sheets 343 are interposed between the light guide 342 and the panel assembly 300, and make uniform the luminance of the light from the light guide 342 to be supplied to the panel assembly 300.

The selective reflecting sheet 347 is interposed between the display unit 330 and the backlight unit 340. The selective reflecting sheet 347 partially reflects and partially transmits incident light. Therefore, when the light source 344 is turned on, the light emitted from the light source 344 passes through the selective reflecting sheet 347 and arrives at the panel assembly 300 to be used in displaying images, while when the light source 344 is turned off, external light that have passed through the panel assembly 300 is reflected by the selective reflecting sheet 347 and re-entered the panel assembly 300 to be used in displaying images. Examples of the selective reflecting sheet 347 include a film including several cholesteric liquid crystal layers and a double brightness enhanced film (DBEF).

The reflecting sheet 341 is disposed under the light guide 342, and reflects the light from the bottom of the light guide 342 to return the light to the light guide 342, thereby improving the usage of light.

The mold frame 364 receives the reflecting sheet 341, the light guide 342, the optical sheets 343, and the panel assembly 300. The mold frame 364 includes a bottom 251 having an opening and sidewalls 252 extending from the bottom 251, and may be made of synthetic resin, etc.

In a complete assembly, the circuit board 550 is curved along an outer surface of the sidewall 252 of the mold frame 364. The outer surface of the sidewall 252 of the mold frame 364 is recessed and a plurality of male snaps 51 for fastening the mold frame 364 with the bottom chassis 362 are formed in the recess.

The bottom chassis 362 may be made of a metal and receives the mold frame 364. The bottom chassis 362 includes a bottom plate 261 and side plates 261 extending upward from edges of the bottom plate 261. The side plate 262 has a plurality of female snaps 61 corresponding to the male snaps 51.

The mold frame 364 and the bottom chassis 362 are fastened by clicking the male snaps 51 and the female snaps 61, and the side plate 262 of the bottom chassis 362 are fitted into the recess of the outer surface of the sidewall 251 of the mold frame 364. The depth of the recess of the mold frame 364 is substantially equal to the thickness of the side plate 262 of the bottom chassis 362 such that the volume of the LCD is reduced.

The top chassis 361 is disposed on the panel assembly 300. The top chassis 361 has an opening exposing an effective display area of the panel assembly 300 for displaying images, and is fastened with the bottom chassis 362. The top chassis 361 secures the panel assembly 300, and fastens the panel assembly 300 in the mold frame 364.

An exemplary LC panel assembly according to an embodiment of the present invention will be described in detail with reference to FIGS. 2, 3, 4A, 4B and 4C as well as FIGS. 5A-5C.

Figure 2:
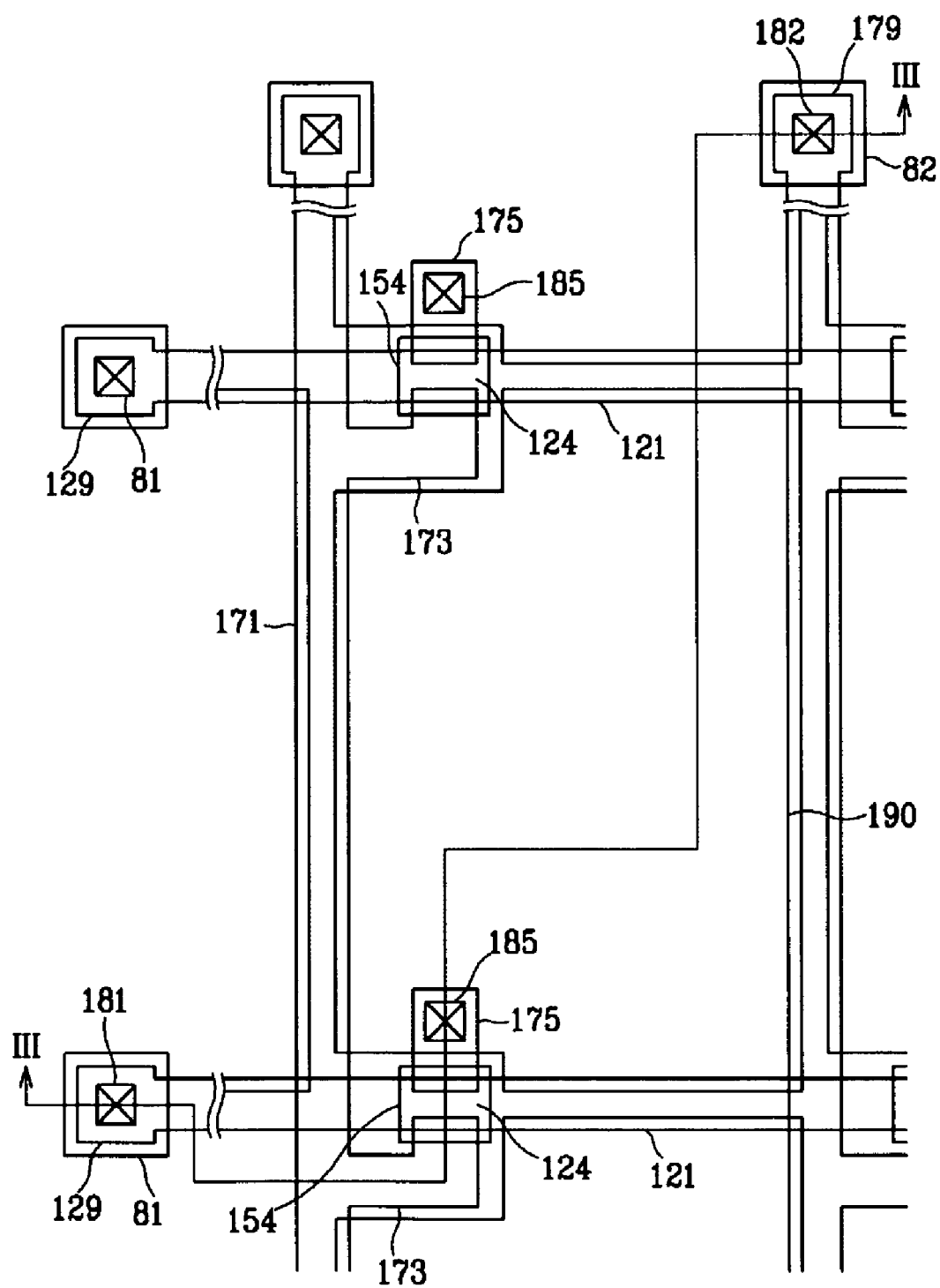
FIG. 2 is a layout view of an LC panel assembly according to an embodiment of the present invention.
Figure 3:
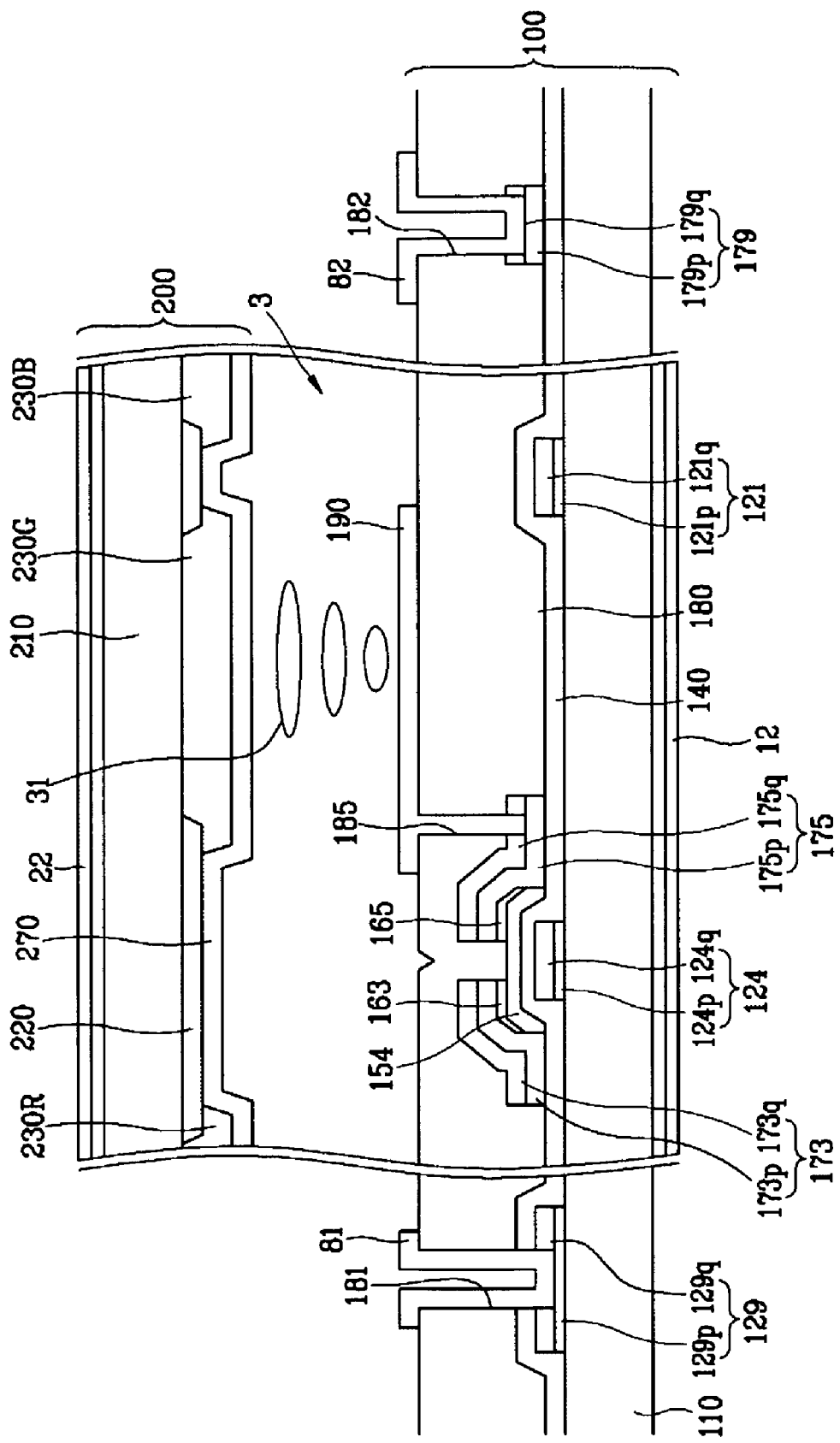
FIG. 3 is a sectional view of the LC panel assembly shown in FIG. 2 taken along the line III-III.
Figure 4A:
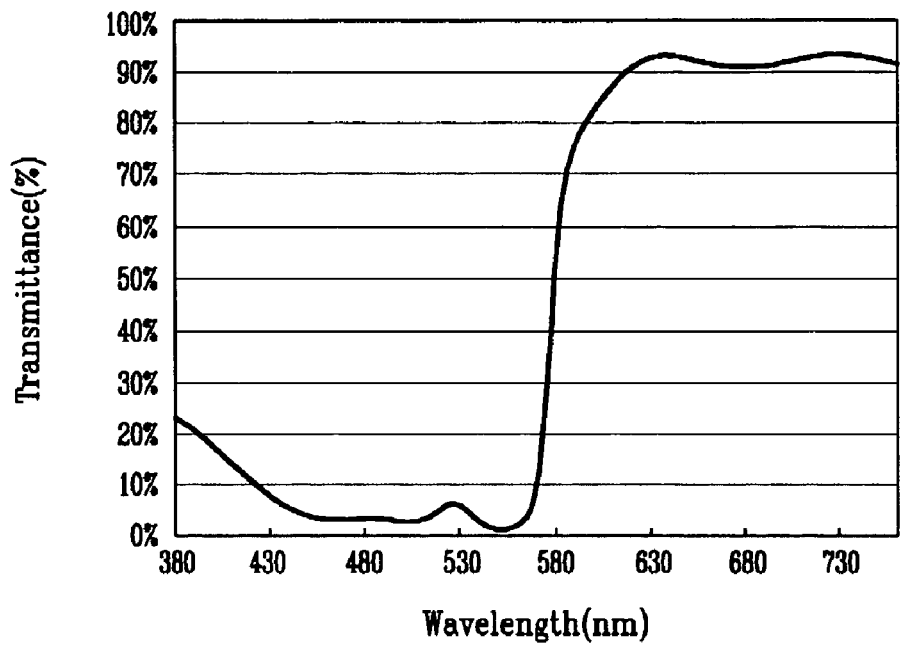
FIGS. 4A, 4B and 4C are graphs illustrating transmission spectra of conventional red, green, and blue color filters.
Figure 4B:
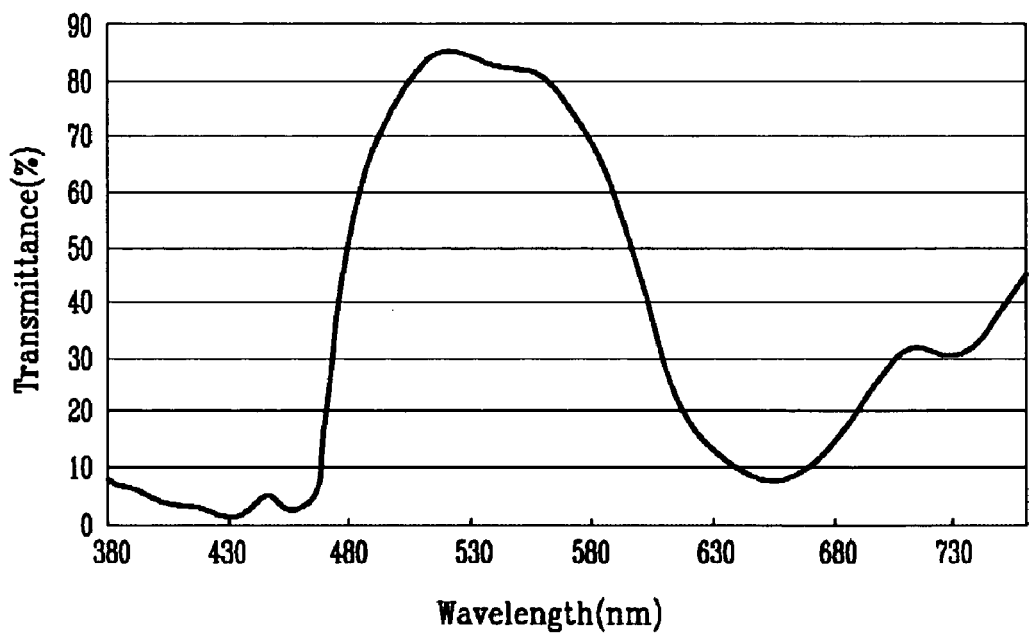
Figure 4C:
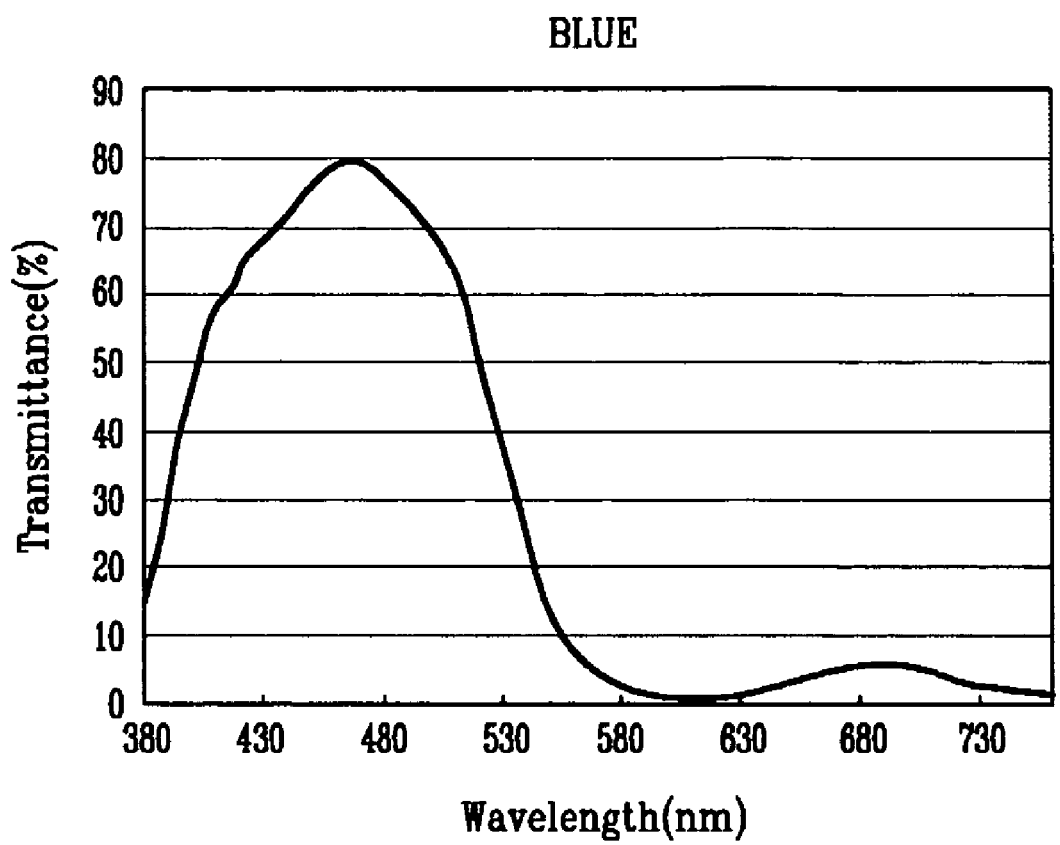

FIG. 2 is a layout view of an LC panel assembly according to an embodiment of the present invention, FIG. 3 is a sectional view of the LC panel assembly shown in FIG. 2 taken along the line III-III, and FIGS. 4A, 4B and 4C are graphs illustrating transmission spectra of conventional red, green, and blue color filters.

An LC panel assembly according to an embodiment of the present invention includes a lower panel 100, an upper panel 200 facing the lower 100, and an LC layer 3 interposed between the panels 100 and 200.

First, the lower panel 100 will be described.

A plurality of gate lines 121 are formed on an insulating substrate 110 such as transparent glass or plastic.

The gate lines 121 transmit gate signals and extend substantially in a transverse direction. Each of the gate lines 121 includes a plurality of gate electrodes 124 and an end portion 129 having a large area for contact with another layer or an external driving circuit. A gate driving circuit (not shown) for generating the gate signals may be directly mounted in a form of integrated circuit chip on the substrate 110 as shown in FIG. 1. However, the gate driving circuit may be mounted on a flexible printed circuit (FPC) film (not shown), which may be attached to the substrate 110, or integrated onto the substrate 110. The gate lines 121 may extend to be connected to a driving circuit that may be integrated on the substrate 110.

The gate lines 121 include two conductive films, a lower film 121$p$ and an upper film 121$q$ disposed thereon, which have different physical characteristics. The upper film 121$q$ may be made of low resistivity metal including Al containing metal such as Al and Al alloy, Ag containing metal such as Ag and Ag alloy, and Cu containing metal such as Cu and Cu alloy, for reducing signal delay or voltage drop. The lower film 121$p$ may be made of material such as Mo containing metal such as Mo and Mo alloy, Cr, Ta, or Ti, which has good physical, chemical, and electrical contact characteristics with other materials such as indium tin oxide (ITO) or indium zinc oxide (IZO). A good example of the combination of the two films is a lower Cr film and an upper Al (alloy) film. The upper film 129$q$ of the end portions 129 of the gate lines 121 is removed to expose the lower film 129$p$.

However, the upper film 121$q$ may be made of good contact material, and the lower film 121$p$ may be made of low resistivity material. In addition, the gate lines 121 may include a single layer preferably made of the above-described materials. Otherwise, the gate lines 121 may be made of various metals or conductors.

In FIGS. 2 and 3, for the gate electrodes 124, the lower and upper films thereof are denoted by additional characters p and q, respectively.

The lateral sides of the gate lines 121 are inclined relative to a surface of the substrate 110, and the inclination angle thereof ranges about 30-80 degrees.

A gate insulating layer 140 preferably made of silicon nitride (SiNx) or silicon oxide (SiOx) is formed on the gate lines 121.

A plurality of semiconductor islands 154 preferably made of hydrogenated amorphous silicon (abbreviated to "a-Si") or polysilicon are formed on the gate insulating layer 140. The semiconductor islands 154 are disposed on the gate electrodes 124.

A plurality of ohmic contact islands 163 and 165 are formed on the semiconductor islands 154. The ohmic contacts 163 and 165 are preferably made of n+ hydrogenated a-Si heavily doped with n type impurity such as phosphorous or they may be made of silicide.

The lateral sides of the semiconductor islands 154 and the ohmic contacts 163 and 165 are inclined relative to the surface of the substrate 110, and the inclination angles thereof are preferably in a range of about 30-80 degrees.

A plurality of data lines 171 and a plurality of drain electrodes 175 are formed on the ohmic contacts 163 and 165 and the gate insulating layer 140.

The data lines 171 transmit data signals and extend substantially in the longitudinal direction to intersect the gate lines 121. Each data line 171 includes a plurality of source electrodes 173 projecting toward the gate electrodes 124 and an end portion 179 having a large area for contact with another layer or an external driving circuit. A data driving circuit (not shown) for generating the data signals may be directly mounted in a form of integrated circuit chip on the substrate 110 as shown in FIG. 1. However, mounted on a FPC film (not shown), which may be attached to the substrate 110, the data driving circuit may be directly mounted on the substrate 110, or integrated onto the substrate 110. The data lines 171 may extend to be connected to a driving circuit that may be integrated on the substrate 110.

The drain electrodes 175 are separated from the data lines 171 and disposed opposite the source electrodes 173 with respect to the gate electrodes 124.

A gate electrode 124, a source electrode 173, and a drain electrode 175 along with a semiconductor island 154 form a TFT having a channel formed in the semiconductor island 154 disposed between the source electrode 173 and the drain electrode 175.

The data lines 171 and the drain electrodes 175 include two conductive films, a lower film 171p and 175p and an upper film 171q and 175q disposed thereon, which have different physical characteristics. The upper film 171q and 175q may be made of low resistivity metal including Al containing metal such as Al and Al alloy, Ag containing metal such as Ag and Ag alloy, and Cu containing metal such as Cu and Cu alloy, for reducing signal delay or voltage drop. The lower film 171p and 175p may be made of refractory metal such as Cr, Mo, Ta, Ti, or alloys thereof. A good example of the combination of the two films is a lower Cr/Mo (alloy) film and an upper Al (alloy) film. The upper film 179q of the end portions 179 of the gate lines 171 is removed to expose the lower film 179p. However, the data lines 171 and the drain electrodes 175 may include a single layer preferably made of the above-described materials. Otherwise, the data lines 171 and the drain electrodes 175 may be made of various metals or conductors.

In FIGS. 2 and 3, for the source electrodes 173, the lower and upper films thereof are denoted by additional characters p and q, respectively.

The data lines 171 and the drain electrodes 175 have inclined edge profiles, and the inclination angles thereof range about 30-80 degrees.

The ohmic contacts 163 and 165 are interposed only between the underlying semiconductor islands 154 and the overlying conductors 171 and 175 thereon and reduce the contact resistance therebetween. The semiconductor islands 154 include some exposed portions, which are not covered with the data lines 171 and the drain electrodes 175, such as portions located between the source electrodes 173 and the drain electrodes 175.

A passivation layer 180 is formed on the data lines 171, the drain electrodes 175, and the exposed portions of the semiconductor islands 154. The passivation layer 180 may be made of inorganic or organic insulator and it may have a flat top surface. Examples of the inorganic insulator include silicon nitride and silicon oxide. The organic insulator may have photosensitivity and dielectric constant less than about 4.0. The passivation layer 180 may include a lower film of inorganic insulator and an upper film of organic insulator such that it takes the excellent insulating characteristics of the organic insulator while preventing the exposed portions of the semiconductor islands 154 from being damaged by the organic insulator.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181 exposing the end portions 129 of the gate lines 121.

A plurality of pixel electrodes 191 and a plurality of contact assistants 81 and 82 are formed on the passivation layer 180. They may be made of transparent conductor such as ITO or IZO or reflective conductor such as Ag, Al, Cr, or alloys thereof.

The pixel electrodes 191 are physically and electrically connected to the drain electrodes 175 through the contact holes 185 such that the pixel electrodes 191 receive data voltages from the drain electrodes 175. The pixel electrodes 191 supplied with the data voltages generate electric fields in cooperation with a common electrode 270 of the upper panel 200 supplied with a common voltage, which determine the orientations of liquid crystal molecules 31 of the liquid crystal layer 3 disposed between the two field generating electrodes 191 and 270. A pixel electrode 191 and the common electrode 270 form a capacitor referred to as a "liquid crystal capacitor," which stores applied voltages after the TFT turns off.

Pixel electrode 191 overlaps the gate line 121 for the previous row to form a storage capacitor, which enhances the voltage storing capacity of the liquid crystal capacitor.

The contact assistants 81 and 82 are connected to the end portions 129 of the gate lines 121 and the end portions 179 of the data lines 171 through the contact holes 181 and 182, respectively. The contact assistants 81 and 82 protect the end portions 129 and 179 and enhance the adhesion between the end portions 129 and 179 and external devices.

The description of the common electrode panel 200 follows.

A light blocking member 220 is formed on an insulating substrate 210 such as transparent glass or plastic. The light blocking member 220 is also referred to as "black matrix" and blocks light leakage between the pixel electrodes 191. The light blocking member 220 has a plurality of openings facing the pixel electrodes 191 and the openings may have substantially the same planar shape as the pixel electrodes 191. Otherwise, the light blocking member 220 may include a plurality of rectilinear portions facing the data lines 171 on the TFT array panel 100 and a plurality of widened portions facing the TFTs on the TFT array panel 100.

A plurality of color filters 230 are formed on the substrate 210 and the light blocking member 220. The color filters 230 are disposed substantially in the areas enclosed by the light blocking member 220 and may extend substantially in the longitudinal direction along columns of the pixel electrodes 191. Each of the color filters 230 may represent one of the primary colors such as red, green and blue colors. Some of the pixel electrodes 191 may not face the color filters 230, and the color filters 230 may include white color filters that may be made of a transparent resin.

The red color filters, as shown in FIG. 5A, transmit about less than 10% of light having a wavelength of about 430 nm to about 560 nm. The transmittance of the red color filters rapidly increases for a wavelength of about 560 nm to about 630 nm and reaches about 90% or more for red light having a wavelength equal to or longer than about 630 nm. The red color filters also transmit about 10% or more of visible light having a wavelength equal to or shorter than about 420 nm. As compared with the transmittance of a conventional red color filter shown in FIG. 4A, the transmittance of the red color filters shown in FIG. 5A shows a lower value for a wavelength from about 430 nm to about 560 nm.

The green color filters, as shown in FIG. 5B, transmit about 10% or more of light having a wavelength from about 480 nm to about 620 nm, and in particular, the transmittance thereof reaches about 77-85% (averaging about 80%) of light having a wavelength of about 540 nm. The green color filters transmit about 15-20% (averaging about 20%) of visible light having a wavelength equal to or shorter than about 460 nm, and transmit about 5% or less of light having a wavelength equal to or longer than about 700 nm. As compared with the transmittance of a conventional green color filter shown in FIG. 4B, the transmittance of the green color filters shown in FIG. 5B shows a higher value for a visible wavelength equal to or shorter than about 460 nm, and shows a much lower value for a wavelength equal to or longer than about 700 nm.

The blue color filters, as shown in FIG. 5C, transmit about 10% or more of light having a wavelength from about 380 nm to about 500 nm, and in particular, the transmittance thereof reaches about 70% or more of light having a wavelength of about 440 nm to be a peak. The blue filters transmit about 5% or less of light having a wavelength equal to or longer than about 530 nm. As compared with the transmittance of a conventional green color filter shown in FIG. 4C, the transmittance of the green color filters shown in FIG. 5C abruptly decreases from a shorter wavelength.

The color filters 230 are formed by spin-coating and patterning a pigmented photosensitive film with photolithography. The red color filter contains a red color agent and a magenta color agent in the ratio of about 75:25 and the spin-coating speed for the red color filter may be equal to about 1,300 rpm. The green color filter contains a green color agent and a yellow color agent in the ratio of about 75:25 and the spin-coating speed for the green color filter may be equal to about 850 rpm. The blue color filter contains a blue color agent and a cyan color agent in the ratio of about 88:12 and the spin-coating speed for the blue color filter may be equal to about 1,400 rpm.

As described above, when a color filter 230 also transmits light having a wavelength other than a target wavelength as well as transmits light having the target wavelength, the transmitted light has low saturation but high luminance as compared with a color filter that transmits only light having the target wavelength. That is, the amount of light blocked by a low-saturation color filter is smaller than that blocked by a high-saturation color filter.

The low-saturation color filter giving high transmittance is useful for an LCD including the selective reflecting film 347 particularly when the LCD displays images only with an external light but without the light from the light source 344 since a high-saturation color filter may excessively absorb the external light to cause abnormal images.

A common electrode 270 is formed on the overcoat 250. The common electrode 270 may be preferably made of transparent conductive material such as ITO and IZO.

Alignment layers (not shown) that may be homogeneous or homeotropic are coated on inner surfaces of the panels 100 and 200, and polarizers 12 and 22 are provided on outer surfaces of the panels 100 and 200 so that their polarization axes may be crossed or parallel to each other. One of the polarizers 12 and 22 may be omitted when the LCD is a reflective LCD.

The LC layer 3 may have positive or negative dielectric anisotropy and it is subjected to a twisted nematic (TN) alignment in the absence of an electric field. However, the LC layer 3 may be subjected to a vertical alignment that the LC molecules 31 in the LC layer 3 are aligned such that their long axes are substantially vertical to the surfaces of the panels 100 and 200 or substantially parallel to the surfaces of the panels 100 and 200 with their long axes being parallel to each other, in the absence of an electric field.

The LC panel assembly may further include a plurality of elastic spacers (not shown) supporting the panels 100 and 200 to form a gap therebetween.

The LC panel assembly may further include a sealant (not shown) adhering the panels 100 and 200. The sealant may be disposed along the edges of the upper panel 200.

The color filters 230 having the above-described wavelength-dependent transmittance and the light source 344 having the above-described light spectrum can give high luminance and high color reproducibility.

Figure 6:
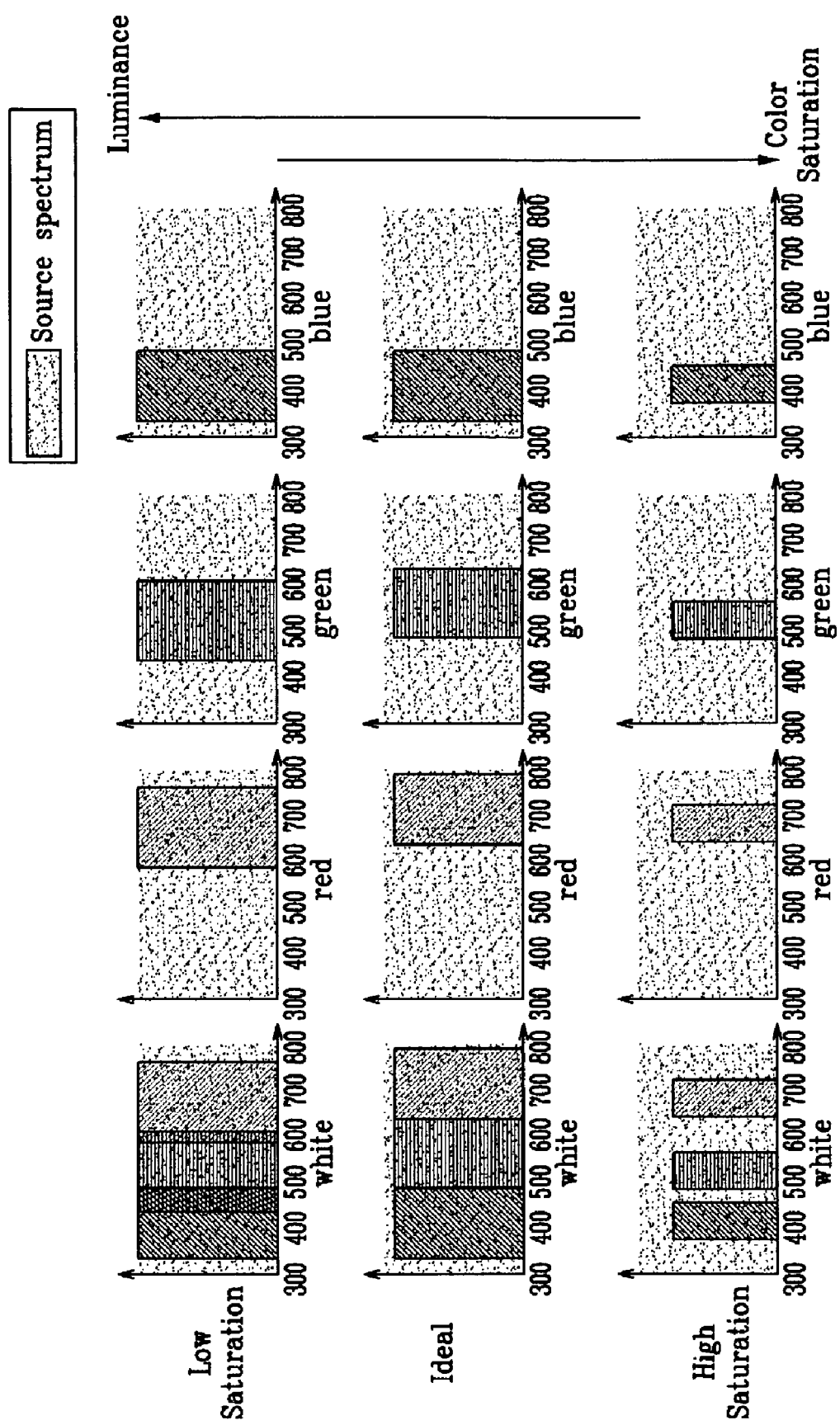
FIG. 6 is a graph showing color saturation and luminance of various color filters for a light having a continuous spectrum.

FIG. 6 is a graph showing color saturation and luminance of various color filters for a light having a continuous spectrum.

Referring to FIG. 6, when a white light having a continuous spectrum passes through ideal color filters, the transmitted lights from the red, green, and blue color filters have no overlapping range of their wavelengths and have broad ranges of wavelengths. Accordingly, both the color reproducibility and the transmittance are excellent.

However, when a white light having a continuous spectrum passes through low-saturation color filters, the transmitted lights from the red, green, and blue color filters have overlapping ranges of their wavelengths. Therefore, the color reproducibility is poor although the transmittance is high.

On the contrary, when a white light having a continuous spectrum passes through high-saturation color filters, the transmitted lights from the red, green, and blue color filters have no overlapping range of their wavelengths. However, the color filters absorb considerable amounts of lights and thus a large amount of visible lights may not be used. Therefore, although the color reproducibility is good, the transmittance is low.

Figure 7:
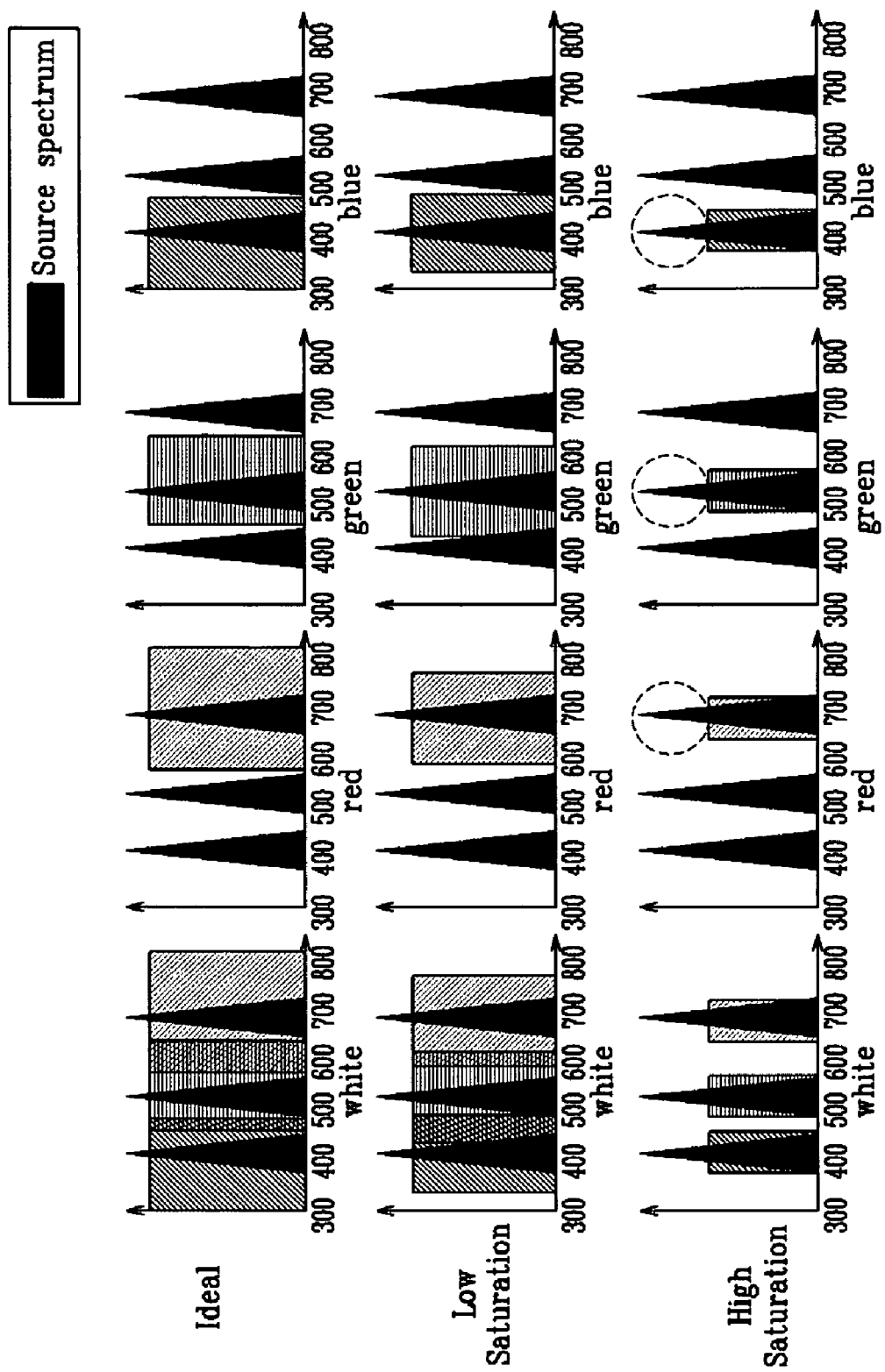
FIG. 7 is a graph showing color saturation and luminance of various color filters for a light having a discontinuous spectrum.

FIG. 7 is a graph showing color saturation and luminance of various color filters for a light having a discontinuous spectrum.

Referring to FIG. 7, when a white light having a discontinuous spectrum passes through ideal color filters, the transmitted lights from the red, green, and blue color filters have no overlapping range of their wavelengths and have broad ranges of wavelengths.

When the discrete-spectrum white light passes through low-saturation color filters, the transmitted lights from the red, green, and blue color filters have very narrow overlapping ranges of their wavelengths. Accordingly, the color reproducibility is so excellent that the light passing through the green color filter has a negligible blue light component and the light passing through the blue color filter has a negligible green light component. Furthermore, the lost amount of light is very small to give high luminance.

However, high-saturation color filters still give good color reproducibility but poor transmittance.

It is understood from FIG. 7 that low-saturation color filters along with a light source having a discontinuous spectrum can provide excellent color reproducibility and high transmittance.

Figure 8A:
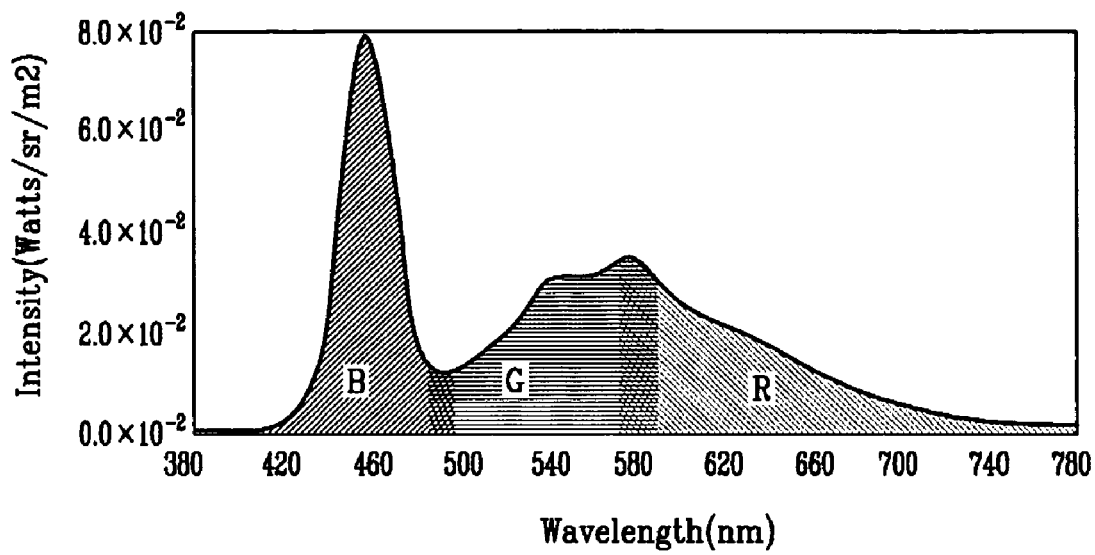
FIG. 8A is a graph illustrating an emission spectrum of a conventional white LED.
Figure 8B:
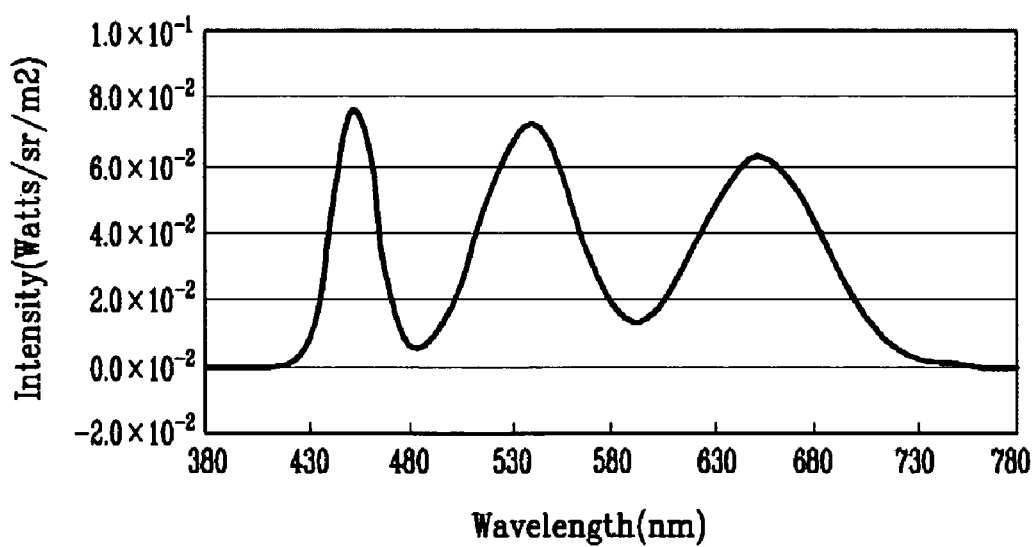
FIG. 8B is a graph illustrating an emission spectrum of a light source according to an embodiment of the present invention.

FIG. 8A is a graph illustrating an emission spectrum of a conventional white LED, and FIG. 8B is a graph illustrating an emission spectrum of a light source according to an embodiment of the present invention.

The emission spectrum shown in FIG. 8A is that of a conventional white LED that is manufactured by coating a yellow fluorescent material on an LED emitting ultra-violet light and blue light. Since the peaks for red, green, and blue regions are not separated in the conventional white LED as shown in FIG. 8A, the conventional white LED may not be suitable for low-saturation color filters.

However, the peaks for red, green, and blue regions in the emission spectrum shown in 8B are clearly distinguishable and thus low-saturation color filters may yield very narrow overlapping wavelength ranges. Accordingly, the light source having the emission spectrum shown in FIG. 8B is suitable for the low-saturation color filters to obtain excellent color reproducibility.

Figure 9A:
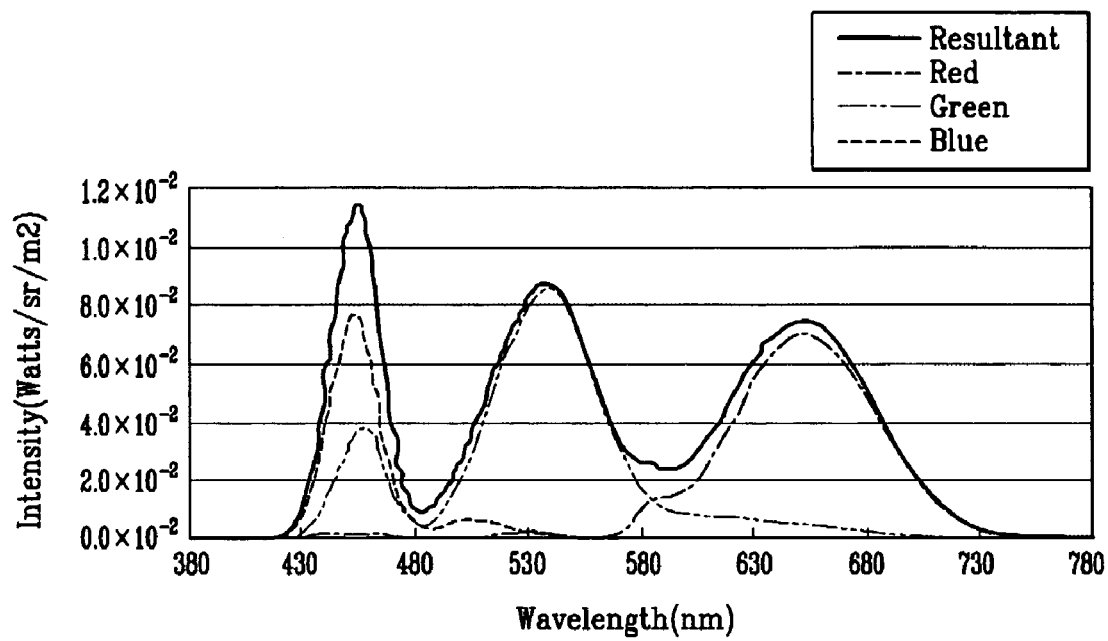
FIG. 9A is a graph illustrating transmission spectra of the color filters shown in FIGS. 5A, 5B and 5C for the white light shown in FIG. 8B and a resultant spectrum obtained by adding the transmission spectra.

FIG. 9A is a graph illustrating transmission spectra of the color filters shown in FIGS. 5A, 5B and 5C for the white light shown in FIG. 8B and a resultant spectrum obtained by adding the transmission spectra.

Referring to FIG. 9A, the transmission spectra of the red color filter and the blue color filter have the peaks almost coinciding with the red peak and the blue peak shown in FIG. 8B. The transmission spectrum of the green color filter has a dominant peak corresponding to the green peak shown in FIG. 8B and has a low subsidiary peak in the blue light region. Therefore, the spectrum of a white light obtained by adding the transmitted lights from the red, green, and blue color filters is very similar to that shown in FIG. 8B. This means that the color filters according to embodiments of the present invention very effectively use the white light having the emission spectrum shown in FIG. 8B.

In particular, since the green color filters transmit about 80% of a green component having a relatively long wavelength of about 540 nm and transmit about 20% of a blue component having a wavelength equal to or shorter than about 460 nm, an observer may recognize the transmitted light from the green color filters as a green light having a wavelength of about 520 nm, which is the average of the green component and the blue component and corresponds to the standard wavelength of the green light. Accordingly, the color reproducibility is good.

Since the green color filters transmit a blue component as well as a green component and the two components are added to represent a green light, the resultant green light has high luminance. Since the green color is the most significant in the luminance among the three colors, this characteristic of the green color filters greatly contributes to the increase of the luminance.

Figure 9B:
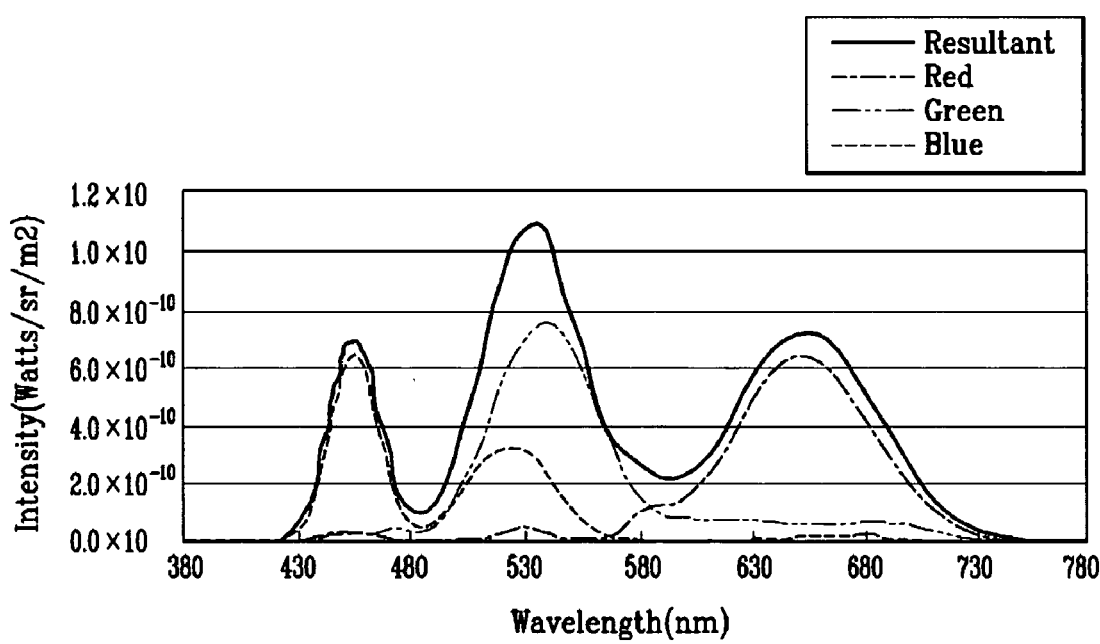
FIG. 9B is a graph illustrating transmission spectra of the color filters shown in FIGS. 4A, 4B and 4C for the white light shown in FIG. 8B and a resultant spectrum obtained by adding the transmission spectra.

FIG. 9B is a graph illustrating transmission spectra of the color filters shown in FIGS. 4A, 4B and 4C for the white light shown in FIG. 8B and a resultant spectrum obtained by adding the transmission spectra.

Referring to FIG. 9B, the transmitted light from the blue color filter contains green component, while the transmitted light from the green color filter hardly contains blue component. Therefore, the spectrum of the resultant white light contains less blue component and much green component as compared with FIG. 9A. However, the transmittance is still high and the three peaks are distinct. This means that although the efficiency of the white light is slightly decreased as compared with that shown in FIG. 9A, the light transmittance and the color reproducibility in case of using conventional color filters and a light source according to an embodiment of the present invention are still good enough to be used.

In the meantime, the color filters shown in FIGS. 5A, 5B and 5C with a conventional light source may also provide improved transmittance and improved color saturation.

An LC panel assembly according to another embodiment of the present invention will be described in detail with reference to FIGS. 10, 11 and 12.

Figure 10:
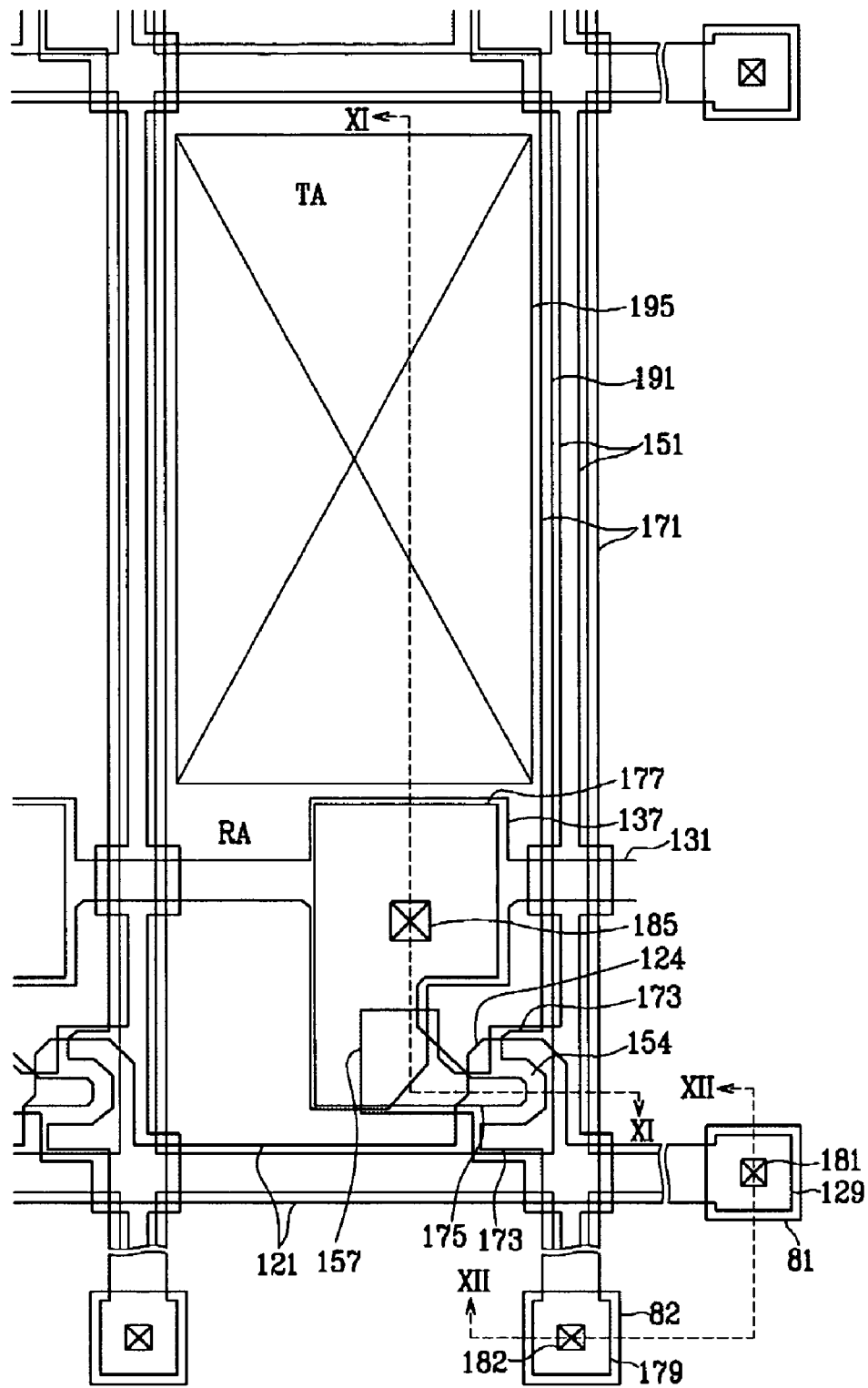
FIG. 10 is a layout view of an LC panel assembly according to another embodiment of the present invention.
Figure 11:
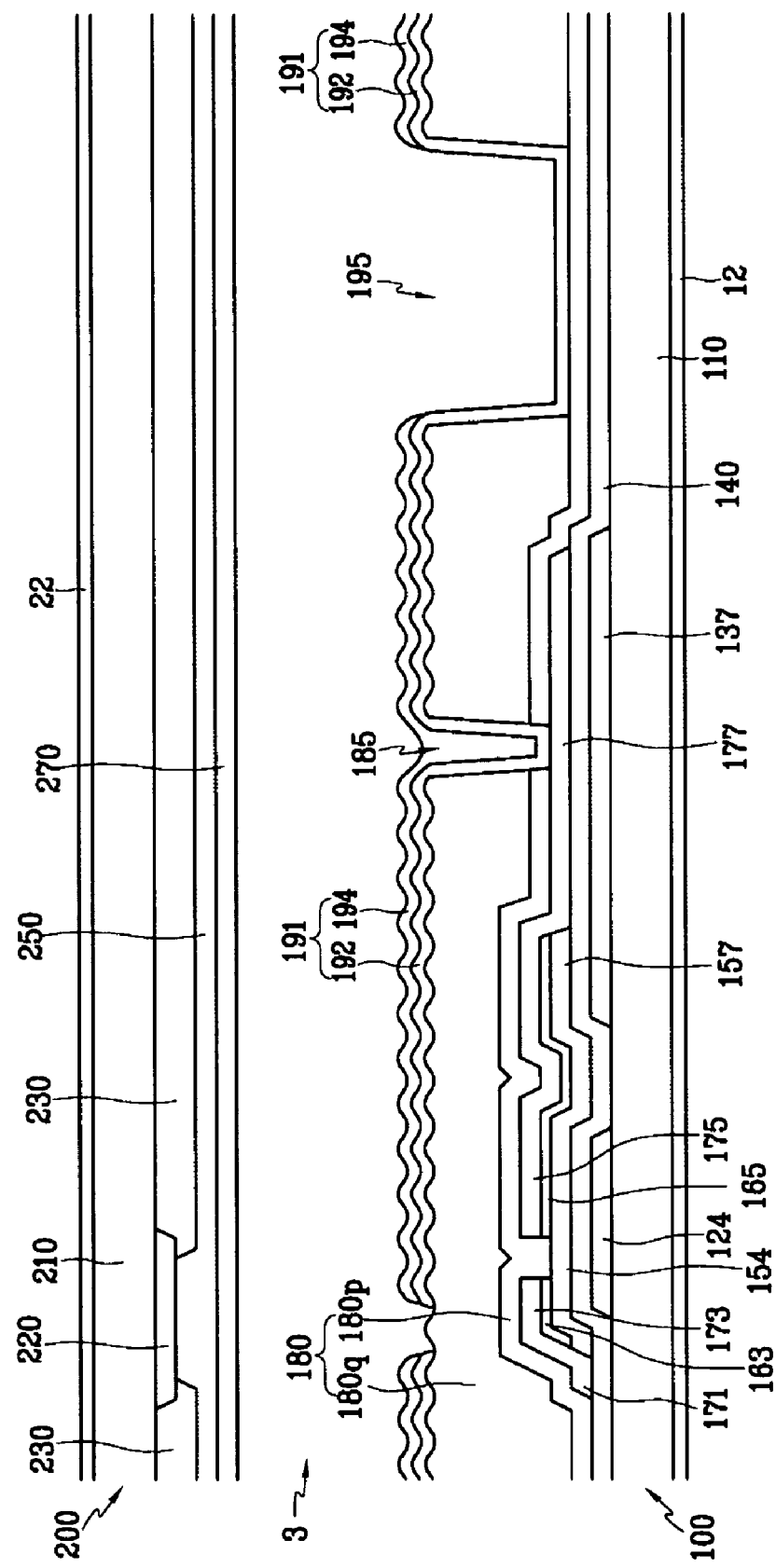
FIG. 11 is a sectional view of the LC panel assembly shown in FIG. 10 taken along line XI-XI.
Figure 12:
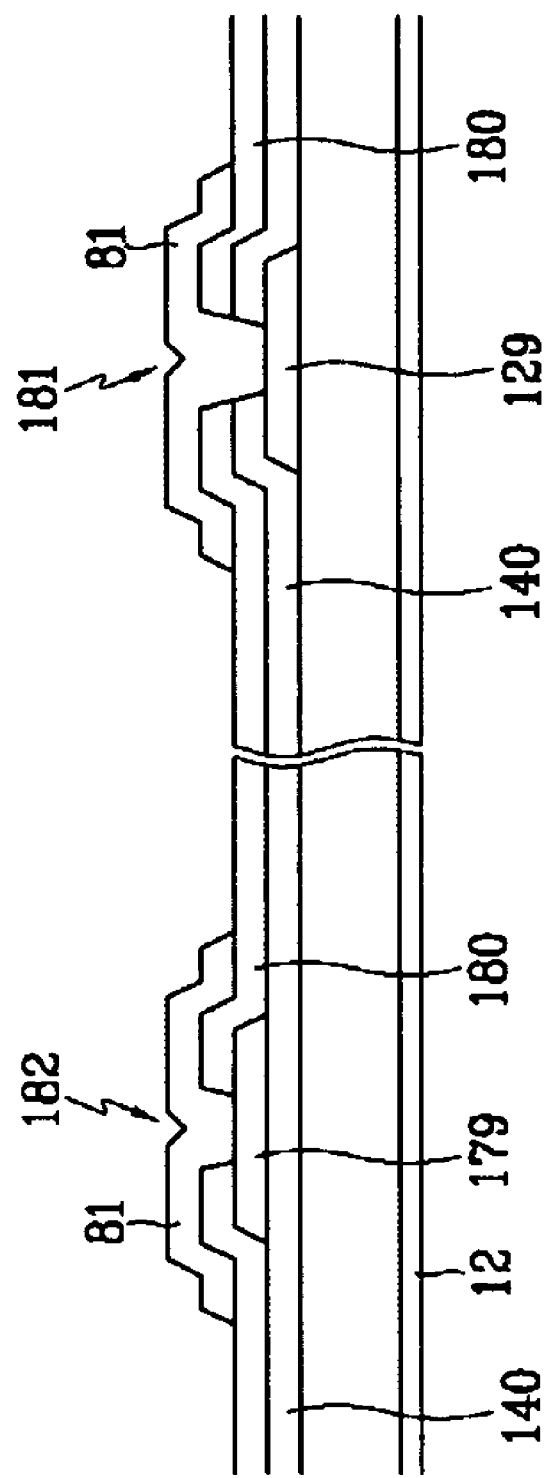
FIG. 12 is a sectional view of the LC panel assembly shown in FIG. 10 taken along line XII-XII.

FIG. 10 is a layout view of an LC panel assembly according to another embodiment of the present invention, FIG. 11 is a sectional view of the LC panel assembly shown in FIG. 10 taken along line XI-XI, and FIG. 12 is a sectional view of the LC panel assembly shown in FIG. 10 taken along line XII-XII.

An LC panel assembly according to this embodiment also includes a lower panel 100, an upper panel 200, a LC layer 3, and a pair of polarizers 12 and 22.

Layered structures of the panels 100 and 200 according to this embodiment are almost the same as those shown in FIGS. 2 and 3.

Regarding the lower panel 100, a plurality of gate lines 121 including gate electrodes 124 and end portions 129 are formed on a substrate 110. A gate insulating layer 140, a plurality of semiconductors 154, and a plurality of ohmic contacts 163 and 165 are sequentially formed on the gate lines 121. A plurality of data lines 171 including source electrodes 173 and end portions 179 and a plurality of drain electrodes 175 are formed on the ohmic contacts 163 and 165 and the gate insulating layer 140, and a passivation layer 180 is formed thereon. A plurality of contact holes 181, 182 and 185 are provided at the passivation layer 180 and the gate insulating layer 140. A plurality of pixel electrodes 191 and a plurality of contact assistants 81 and 82 are formed on the passivation layer 180.

Regarding the upper panel 200, a light blocking member 220, a plurality of color filters 230, and a common electrode 270 are formed on an insulating substrate 210.

Different from the LC panel assembly shown in FIGS. 2 and 3, a plurality of storage electrode lines 131 are formed on the substrate 110 and under the gate insulating layer 140.

The storage electrode lines 131 are supplied with a predetermined voltage and extend substantially parallel to the gate lines 121. Each of the storage electrode lines 131 is disposed between two adjacent gate lines 121 and it is close to the lower one of the two adjacent gate lines 121. Each of the storage electrode lines 131 includes a storage electrode 137 expanding upward and downward. However, the storage electrode lines 131 may have various shapes and arrangements.

The gate lines 121 and the storage electrode lines 131 has a single layer structure that may be made of an Al containing metal, an Ag containing metal, a Cu containing metal, a Mo containing metal, Cr, Ta, or Ti. However, the gate lines 121 and the storage electrode lines 131 may have a multi-layered structure including two conductive films (not shown) having different physical characteristics.

The semiconductors 154 and the ohmic contacts 163 extend along the data lines 171 to form semiconductor stripes 151 and ohmic contact stripes 161. The semiconductor stripes 151 and the ohmic contact stripes 161 become wide near the gate lines 121 and the storage electrode lines 131 such that the semiconductor stripes 151 cover large areas of the gate lines 121 and the storage electrode lines 131 to smooth the profile of the surface, thereby preventing the disconnection of the data lines 171.

Each of the drain electrodes 175 includes a wide end portion 177 and a narrow end portion. The wide end portion 177 overlaps a storage electrode 137 and the narrow end portion is partly enclosed by a source electrode 173 that is curved like a character J.

The data lines 171 and the drain electrodes 175 has a single layer structure that may be made of refractory metal such as Cr, Mo, Ta, Ti, or alloys thereof. However, they may have a multilayered structure including a refractory metal film (not shown) and a low resistivity film (not shown).

The passivation layer 180 includes a lower passivation film 180p preferably made of an inorganic insulator such as silicon nitride or silicon oxide and an upper passivation film 180q preferably made of an organic insulator. The organic insulator preferably has dielectric constant less than about 4.0 and it may have photosensitivity. The upper passivation film 180*q* has a plurality of openings exposing portions of the lower passivation film 180*p* and it has unevenness on its top surface. The passivation layer 180 may have a single-layer structure preferably made of an inorganic or organic insulator.

Each of the pixel electrodes 191 has a contour that follows the contour of the upper passivation film 180*q* and includes a transparent electrode 192 and a reflective electrode 194 disposed thereon. The transparent electrode 192 may be made of a transparent conductor such as ITO or IZO, and the reflective electrode 194 may be made of a reflective metal such as Al, Ag, Cr, or alloys thereof. However, the reflective electrode 194 may have a dual-layered structure including a low-resistivity, reflective upper film (not shown) preferably made of Al, Ag, or alloys thereof and a good contact lower film (not shown) preferably made of Mo containing metal, Cr, Ta, or Ti having good contact characteristics with ITO or IZO.

The reflective electrode 194 has a transmissive window 195 disposed in an opening of the upper passivation film 180*q* and exposing the transparent electrode 192.

A pixel of the panel assembly can be divided into a transmissive region TA and a reflective region RA defined by a transparent electrode 192 and a reflective electrode 194, respectively. In detail, the transmissive region TA includes portions of the panel assembly disposed on and under a transmissive window 195, while the reflective region RA includes portions of the panel assembly disposed on and under the reflective electrode 194.

In the transmissive region TA, light incident from a rear surface of the panel assembly, i.e., from the lower panel 100 passes through the LC layer 3 and goes out of a front surface, i.e., out of the upper panel 200, thereby displaying images. In the reflective regions RA, light incident from the front surface enters into the LC layer 3, is reflected by the reflective electrode 194, passes through the LC layer 3 again, and goes out of the front surface, thereby displaying images. At this time, the unevenness of the reflective electrode 194 causes diffused reflection of light to prevent an external object from being reflected to be seen.

Since there is no upper passivation film 180*q* in the transmissive region TA, the thickness of the liquid crystal layer 3, i.e., the cell gap in the transmissive region TA is greater than that in the reflective region RA. In particular, the cell gap in the transmissive region TA is preferably about twice the cell gap in the reflective region RA.

A pixel electrode 191 and expansion 177 of a drain electrode 175 connected thereto overlap storage electrode line 131 including a storage electrode 137 to form as a storage capacitor.

An overcoat 250 is formed on the color filters 230 and the light blocking member 220 of the upper panel 200. The overcoat 250 may be preferably made of (organic) insulator and it prevents the color filters 230 from being exposed and provides a flat surface.

While the present invention has been described in detail with reference to the preferred embodiments, it is to be understood that the invention is not limited to the disclosed embodiments, but, on the contrary, is intended to cover various modifications and equivalent arrangements included within the sprit and scope of the invention.

What is claimed is:

1. A liquid crystal display comprising:
   a liquid crystal panel assembly comprising two substrates facing each other,
   a liquid crystal layer disposed between the two substrates,
   electrodes driving the liquid crystal layer,
   a plurality of red, green, and blue color filters disposed on one of the two substrates; and
   a light source providing light to the liquid crystal panel assembly, said light source having an emission spectrum exhibiting separated peaks corresponding to red, green, and blue regions,
   said green color filter transmitting about 77-85% of light having a wavelength of about 540nm with no absorption gap between approximately 540 nm and 730 nm, and transmitting about 15-20% of light having a wavelength equal to or shorter than about 460 nm.

2. The liquid crystal display of claim 1, wherein the light source emits light comprising a red component having a central wavelength of about 620-680 nm and a half amplitude at about 25-70 nm, a green component having a central wavelength of about 525-545 nm and a half amplitude at about 20-50 nm, and a blue component having a central wavelength of about 430-480 nm and a half amplitude at about 25-70 nm.

3. The liquid crystal display of claim 2, wherein the luminance of the green component and the luminance of the red component is higher than the luminance of the blue component.

4. The liquid crystal display of claim 1, wherein the light source comprises a white light emitting diode that is a blue light emitting diode coated with green and red color fluorescent material.

5. The liquid crystal display of claim 1, wherein the light source comprises a red light emitting diode, a green light emitting diode, and a blue light emitting diode that are arranged in mixture.

6. The liquid crystal display of claim 1, further comprising a selective reflecting film disposed between the liquid crystal panel assembly and the light source.

7. The liquid crystal display of claim 1, wherein one of the electrodes comprises a transparent electrode and a reflective electrode.

8. The liquid crystal display of claim 1, wherein the green color filter transmits at least about 10% of light having a wavelength of from about 480nm to about 620 nm.

9. The liquid crystal display of claim 8, wherein the red color filter transmits at least about 90% of light having a wavelength equal to or longer than about 630 nm, transmits less than about 10% of light having a wavelength of from about 430 nm to about 560 nm, and transmits at least about 10% of light having a wavelength of about 560nm to about 630 nm, and the blue color filter transmit at least about 10% of light having a wavelength from about 380 nm to about 500 nm and transmits at least about 70% of light having a wavelength of about 440 nm.

* * * * *